US010014554B2

(12) United States Patent
Pratt et al.

(10) Patent No.: US 10,014,554 B2
(45) Date of Patent: Jul. 3, 2018

(54) BLOCK COPOLYMER ELECTROLYTES CONTAINING POLYMERIC ADDITIVES

(71) Applicant: Seeo, Inc, Hayward, CA (US)

(72) Inventors: Russell Clayton Pratt, San Mateo, CA (US); Jin Yang, Pleasanton, CA (US); Jonathan C. Pistorino, Oakland, CA (US); Hany Basam Eitouni, Oakland, CA (US); Mohit Singh, Santa Clara, CA (US); Vishal Vijay, Hayward, CA (US)

(73) Assignee: Seeo, Inc., Hayward, CA (US)

( * ) Notice: Subject to any disclaimer, the term of this patent is extended or adjusted under 35 U.S.C. 154(b) by 133 days.

(21) Appl. No.: 15/275,308

(22) Filed: Sep. 23, 2016

(65) Prior Publication Data

US 2017/0092983 A1    Mar. 30, 2017

Related U.S. Application Data

(60) Provisional application No. 62/235,499, filed on Sep. 30, 2015.

(51) Int. Cl.

| H01M 10/052 | (2010.01) |
| H01M 10/0565 | (2010.01) |
| H01M 10/0525 | (2010.01) |
| H01M 4/38 | (2006.01) |
| H01M 4/505 | (2010.01) |
| H01M 4/525 | (2010.01) |
| H01M 4/58 | (2010.01) |
| H01M 4/587 | (2010.01) |

(52) U.S. Cl.
CPC ... *H01M 10/0565* (2013.01); *H01M 10/0525* (2013.01); *H01M 4/382* (2013.01); *H01M 4/386* (2013.01); *H01M 4/505* (2013.01); *H01M 4/525* (2013.01); *H01M 4/587* (2013.01); *H01M 4/5825* (2013.01); *H01M 2300/0082* (2013.01)

(58) Field of Classification Search
CPC ................. H01M 10/052; H01M 10/0525
See application file for complete search history.

(56) References Cited

U.S. PATENT DOCUMENTS

| 8,268,197 B2 | 9/2012 | Singh et al. |
| 8,563,168 B2 | 10/2013 | Balsara et al. |
| 8,598,273 B2 | 12/2013 | Eitouni et al. |
| 8,691,928 B2 | 4/2014 | Hsieh et al. |
| 8,889,301 B2 | 11/2014 | Balsara et al. |
| 9,048,507 B2 | 6/2015 | Eitouni et al. |
| 9,136,562 B2 | 9/2015 | Singh et al. |
| 2009/0075176 A1 | 3/2009 | Singh et al. |

(Continued)

FOREIGN PATENT DOCUMENTS

| WO | 2009146340 A1 | 12/2009 |
| WO | 2010083325 A1 | 7/2010 |
| WO | 2010083330 A1 | 7/2010 |

OTHER PUBLICATIONS

PCT/US2016/053587 International Search Report dated Dec. 2, 2016.

(Continued)

*Primary Examiner* — Olatunji Godo
(74) *Attorney, Agent, or Firm* — R'Sue Popowich Caron

(57) ABSTRACT

Polymer electrolytes incorporating PS-PEO block copolymers, PXE additives, and lithium salts provide improved physical properties relative to PS-PEO block copolymers and lithium salt alone, and thus provide improved battery performance.

23 Claims, 6 Drawing Sheets

(56) References Cited

U.S. PATENT DOCUMENTS

2011/0003211 A1   1/2011   Hudson et al.
2011/0206994 A1   8/2011   Balsara et al.
2013/0066025 A1   3/2013   Yang et al.
2013/0273419 A1   10/2013  Pistorino et al.

OTHER PUBLICATIONS

Mazard, "Dynamic mechanical properties of polystyrene-based block copolymers . . . ," Polym Int 52:514-521 (2003).
Perec, "A radical-anion mechanism for the phase transfer catalyzed depolymerization of poly(2,6-dimethyl-1,4-phenylene oxide)," Polymer Bulletin 24. 63-69 (1990).
Perec, "Synthesis of . . . ," Polymer Bulletin 24. 493-600 (1990).

BLOCK COPOLYMER ELECTROLYTES CONTAINING POLYMERIC ADDITIVES

CROSS-REFERENCE TO RELATED APPLICATIONS

This application claims priority to U.S. Provisional Patent Application 62/235,499, filed Sep. 30, 2015, which is incorporated by reference herein.

BACKGROUND OF THE INVENTION

Field of the Invention

This invention relates generally to electrolytes for lithium batteries, and, more specifically, to additives for solid block copolymer electrolytes.

Some block copolymer electrolytes include a "soft" block that provides ionic conductivity and a "hard" block that provides structural integrity. The resilience of polymer electrolytes based on such block copolymers is dependent on the thermomechanical properties of the so-called "hard" or "mechanical" block. Sufficient physical resistance to the intrusion of uneven or dendritic lithium growth when in contact with lithium metal electrodes is necessary to prevent penetration of lithium through the electrolyte and shorting of the cell. Some current block copolymer electrolytes use polyethylene oxide for the soft block and polystyrene for the hard block. Polystyrene is a well-characterized, inexpensive polymer with good properties, such as a high glass transition temperature (Tg, ~100° C.), that allow it to be used at fairly high temperatures while maintaining high modulus values (>1 GPa), and good physical resiliency. Further improvements in either of these properties would be expected to increase battery performance by providing even greater physical resistance to lithium intrusion and by allowing operation at even higher temperatures, which would increase the ionic conductivity of the soft block.

There are a number of polymers that have better high-temperature properties than polystyrene and might be considered for use as the hard block in block copolymer electrolytes. But many of these are expensive engineering thermoplastics that may be difficult or impossible to use for forming block copolymers with poly(ethylene oxide) and/or to dissolve and process as a solution.

Another approach would be to crosslink the polymer used for the hard block. Cross-linking can improve physical properties, but requires great care in processing and perhaps additional processing steps for characterization and control. If a material crosslinks prematurely, it may not be possible for it to undergo further processing.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

Figure 1A:
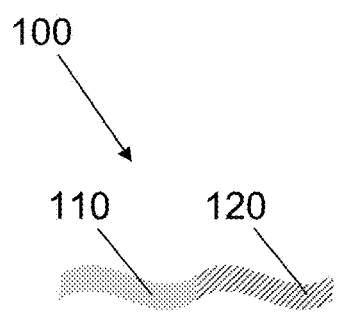
FIGS. 1A, 1B, and 1C are schematic drawings of a diblock copolymer and domain structures it can form.

In one embodiment of the invention, an electrolyte material is disclosed. The electrolyte material has a first phase made of first polymers and a salt, such as a lithium salt. The first phase forms an ionically-conductive domain in the electrolyte material. The electrolyte material has a second phase made of second polymers third polymers. The second phase forms a structural domain adjacent to the ionically-conductive domain. The second phase may be cross-linked. At least some of the first polymers are covalently bonded to at least some of the second polymers to form first block copolymers. In one arrangement, at least some of the first polymers are covalently bonded to at least some of the third polymers to form second block copolymers.

The first polymer may be any of polyethers, polyamines, polyimides, polyamides, poly(alkyl carbonates), polynitriles, polysiloxanes, polyphosphazenes, polyolefins, polydienes, and combinations thereof. The first polymer may be an ionically-conductive comb polymer with a backbone and pendant groups. The backbone may be one or more of polysiloxanes, polyphosphazenes, polyethers, polydienes, polyolefins, polyacrylates, polymethacrylates, and combinations thereof. The pendants may be one or more of oligoethers, substituted oligoethers, nitrile groups, sulfones, thiols, polyethers, polyamines, polyimides, polyamides, poly(alkyl carbonates), polynitriles, other polar groups, and combinations thereof.

In one arrangement, the second polymer and the third polymer are each selected independently from the group consisting of polystyrene, hydrogenated polystyrene, poly(alkyl methacrylate), poly(cyclohexyl methacrylate), poly(methyl methacrylate), polyvinylpyridine, polyimide, polyamide, polyolefins, polypropylene, polyethylene, poly(2,6-dimethyl-1,4-phenylene oxide) (PXE), poly(t-butyl vinyl ether), poly(cyclohexyl vinyl ether), polyfluorocarbons, polyvinylidene fluoride, and copolymers that contain styrene, alkyl methacrylates, and/or vinylpyridine.

The ionically-conductive domain and the structural domain may be arranged as alternating lamellar domains. The ionically-conductive domain and the structural domain may be arranged as bicontinuous domains. The ionically-conductive domain and the structural domain may alternate on a length scale of 5-500 nm.

The electrolyte material may also include fourth polymers in the first phase. At least some of the fourth polymers may be covalently bonded to at least some of the third polymers to form third block copolymers. The fourth polymers may be any of polyethers, polyamines, polyimides, polyamides, poly(alkyl carbonates), polynitriles, polysiloxanes, polyphosphazenes, polyolefins, polydienes, and combinations thereof.

In one arrangement, the electrolyte material has a modulus greater than $1 \times 10^7$ Pa at 80° C. In one arrangement, the electrolyte material has an ionic conductivity greater than $10^{-4}$ Scm$^{-1}$ at 25° C. The electrolyte material may be a solid at cell operating temperatures. The electrolyte material may be a gel if a liquid electrolyte is added to it.

In one arrangement, lithium-ion conducting inorganic ceramics particles are also included in the first phase of the electrolyte material. The particles may be made from one or more of Li$_3$N, LISICON, LIPON, LLTO, LLZO, LATP, thio-LISICON, Li$_2$S—P$_2$S$_5$, and garnet-type Li ion conducting oxides.

In another embodiment of the invention, an electrolyte material has an ionically-conductive phase that includes PEO polymers and a salt. The ionically-conductive phase forms a first domain. The electrolyte material also has a structural phase that includes PS polymers and PXE polymers. The structural phase forms a second domain adjacent to the first domain. At least a portion of the PEO polymers and at least a portion of the PS polymers are covalently bonded together to form first block copolymers. The first block copolymers may be linear block copolymers. In one arrangement, at least a portion of the PEO polymers and a portion of the PXE polymers are covalently bonded together to form second block copolymers. The second block copolymers may be linear block copolymers. In one arrangement, at least a portion of the PS polymers and at least a portion of the PXE polymers are covalently bonded to one another.

In another embodiment of the invention, a battery electrode is disclosed. The electrode has electrode active material particles, optional electronically-conductive particles, and an electrolyte material as described above. The electrode active material particles and the optional electronically-conductive particles are distributed randomly throughout the electrolyte material.

If the electrode is a cathode, the electrode active material particles may be made of a material such as lithium iron phosphate (LFP), LiCoO2, LiMn2O4, lithium nickel cobalt aluminum oxide (NCA), and lithium nickel cobalt manganese oxide (NCM).

If the electrode is an anode, the electrode active material particles may be made of a material such as graphite, lithium metal, Li—Al, Li—Si, Li—Sn, Li—Mg, Si, Si—Sn, Si—Ni, Si—Cu, Si—Fe, Si—Co, Si—Mn, Si—Zn, Si—In, Si—Ag, Si—Ti, Si—Ge, Si—Bi, Si—Sb, Si—Cr, metal oxides, silicon carbides, and mixtures thereof.

In another embodiment of the invention, a battery cell is disclosed. The cell has a positive electrode comprising a positive electrode active material configured to absorb and release lithium ions, a negative electrode comprising a negative electrode active material configured to absorb and release lithium ions, and an electrolyte material as described above. The electrolyte material is positioned to provide ionic communication between the positive electrode and the negative electrode.

DETAILED DESCRIPTION

The preferred embodiments are illustrated in the context of block copolymer electrolytes in an electrochemical cell such as a battery. The skilled artisan will readily appreciate, however, that the materials and methods disclosed herein will have application in a number of other contexts where high temperature operation is desirable.

Nanostructured Block Copolymer Electrolytes

A solid polymer electrolyte, when combined with an appropriate salt, is chemically and thermally stable and has an ionic conductivity of at least $10^{-5}$ Scm$^{-1}$ at operating temperature. Examples of useful operating temperatures include room temperature (25° C.), 40° C., and 80° C. In one arrangement, a polymer electrolyte has an ionic conductivity of at least $10^{-3}$ Scm$^{-1}$ at battery cell operating temperatures, such as between 20° C. and 100° C., or any range subsumed therein. Examples of appropriate salts include, but are not limited to metal salts selected from the group consisting of chlorides, bromides, sulfates, nitrates, sulfides, hydrides, nitrides, phosphides, sulfonamides, triflates, thiocynates, perchlorates, borates, or selenides of lithium, sodium, potassium, silver, barium, lead, calcium, ruthenium, tantalum, rhodium, iridium, cobalt, nickel, molybdenum, tungsten or vanadium. Examples of specific lithium salts include LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$C$_2$F$_5$)$_2$, lithium alkyl fluorophosphates, lithium oxalatoborate, as well as other lithium bis(chelato)borates having five to seven membered rings, lithium bis(trifluoromethane sulfone imide) (LiTFSI), LiPF$_3$(C$_2$F$_5$)$_3$, LiPF$_3$(CF$_3$)$_3$, LiB(C$_2$O$_4$)$_2$, LiDFOB, and mixtures thereof. In other embodiments of the invention, for other electrochemistries, electrolytes are made by combining the polymers with various kinds of salts. Examples include, but are not limited to AgSO$_3$CF$_3$, NaSCN, NaSO$_3$CF$_3$, KTFSI, NaTFSI, Ba(TFSI)$_2$, Pb(TFSI)$_2$, and Ca(TFSI)$_2$. As described in detail above, a block copolymer electrolyte can be used in the embodiments of the invention.

FIG. 1A is a simplified illustration of an exemplary diblock polymer molecule 100 that has a first polymer block 110 and a second polymer block 120 covalently bonded together. In one arrangement both the first polymer block 110 and the second polymer block 120 are linear polymer blocks. In another arrangement, either one or both polymer blocks 110, 120 has a comb (or branched) structure. In one arrangement, neither polymer block is cross-linked. In another arrangement, one polymer block is cross-linked. In yet another arrangement, both polymer blocks are cross-linked.

Figure 1B:
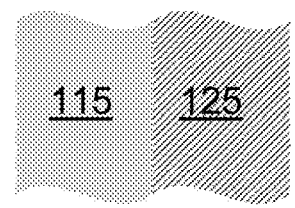
Figure 1C:
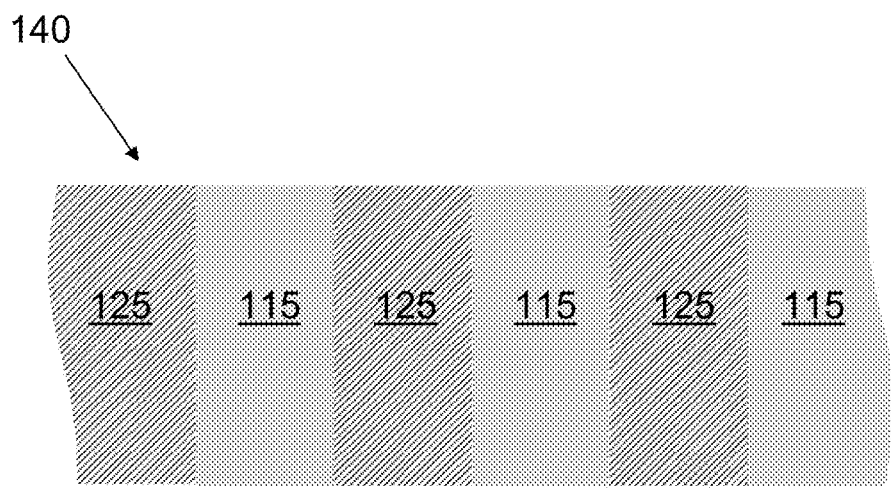

Multiple diblock polymer molecules 100 can arrange themselves to form a first domain 115 of a first phase made of the first polymer blocks 110 and a second domain 125 of a second phase made of the second polymer blocks 120, as shown in FIG. 1B. Diblock polymer molecules 100 can arrange themselves to form multiple repeat domains, thereby forming a continuous nanostructured block copolymer material 140, as shown in FIG. 1C. The sizes or widths of the domains can be adjusted by adjusting the molecular weights of each of the polymer blocks. In various embodiments, the domains can be lamellar, cylindrical, spherical, or gyroidal depending on the nature of the two polymer blocks and their ratios in the block copolymer.

In one arrangement the first polymer domain 115 is ionically conductive, and the second polymer domain 125 provides mechanical strength to the nanostructured block copolymer.

Figure 2A:
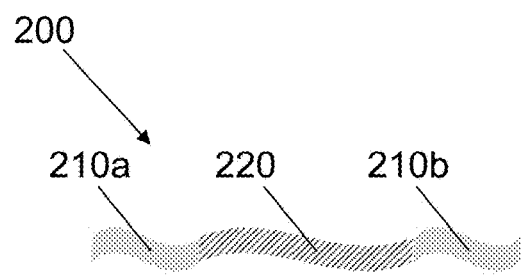
FIGS. 2A, 2B, and 2C are schematic drawings of a triblock copolymer and domain structures it can form.

FIG. 2A is a simplified illustration of an exemplary triblock polymer molecule 200 that has a first polymer block 210a, a second polymer block 220, and a third polymer block 210b that is the same as the first polymer block 210a, all covalently bonded together. In one arrangement the first polymer block 210a, the second polymer block 220, and the third copolymer block 210b are linear polymer blocks. In another arrangement, either some or all polymer blocks 210a, 220, 210b have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 2B:
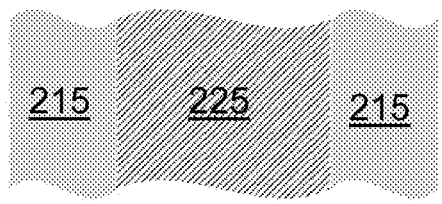
Figure 2C:
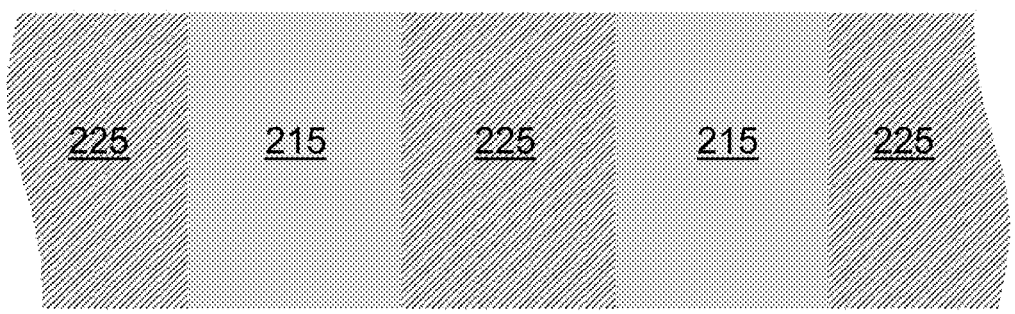

Multiple triblock polymer molecules 200 can arrange themselves to form a first domain 215 of a first phase made of the first polymer blocks 210a, a second domain 225 of a second phase made of the second polymer blocks 220, and a third domain 215 of a first phase made of the third polymer blocks 210b as shown in FIG. 2B. Triblock polymer molecules 200 can arrange themselves to form multiple repeat domains 225, 215 (containing both 215a and 215b), thereby forming a continuous nanostructured block copolymer material 240, as shown in FIG. 2C. The sizes of the domains can be adjusted by adjusting the molecular weights of each of the polymer blocks. In various arrangements, the domains can be lamellar, cylindrical, spherical, gyroidal, or any of the other well-documented triblock copolymer morphologies depending on the nature of the polymer blocks and their ratios in the block copolymer.

In one arrangement the first and third polymer domains 215 are ionically conductive, and the second polymer domain 225 provides mechanical strength to the nanostructured block copolymer. In another arrangement, the second polymer domain 225 is ionically conductive, and the first and third polymer domains 215 provide a structural framework.

Figure 3A:
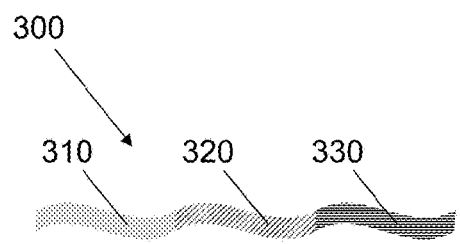
FIGS. 3A, 3B, and 3C are schematic drawings of a triblock copolymer and domain structures it can form.

FIG. 3A is a simplified illustration of another exemplary triblock polymer molecule 300 that has a first polymer block 310, a second polymer block 320, and a third polymer block 330, different from either of the other two polymer blocks, all covalently bonded together. In one arrangement the first polymer block 310, the second polymer block 320, and the third copolymer block 330 are linear polymer blocks. In another arrangement, either some or all polymer blocks 310, 320, 330 have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 3B:
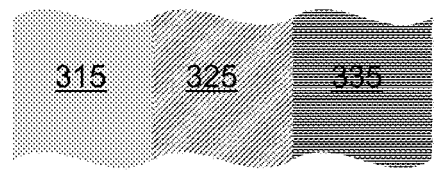
Figure 3C:
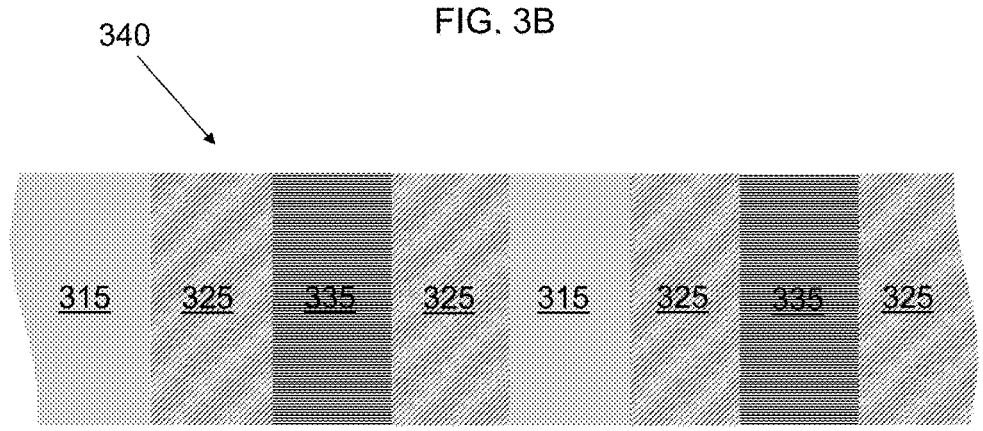

Multiple triblock polymer molecules 300 can arrange themselves to form a first domain 315 of a first phase made of the first polymer blocks 310a, a second domain 325 of a second phase made of the second polymer blocks 320, and a third domain 335 of a third phase made of the third polymer blocks 330 as shown in FIG. 3B. Triblock polymer molecules 300 can arrange themselves to form multiple repeat domains, thereby forming a continuous nanostructured block copolymer material 340, as shown in FIG. 3C. The sizes of the domains can be adjusted by adjusting the molecular weights of each of the polymer blocks. In various arrangements, the domains can be lamellar, cylindrical, spherical, gyroidal, or any of the other well-documented triblock copolymer morphologies depending on the nature of the polymer blocks and their ratios in the block copolymer.

In one arrangement the first polymer domains 315 are ionically conductive, and the second polymer domains 325 provide mechanical strength to the nanostructured block copolymer. The third polymer domains 335 provides an additional functionality that may improve mechanical strength, ionic conductivity, electrical conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer: (1) exhibits ionic conductivity of at least $10^{-5}$ $Scm^{-1}$ at electrochemical cell operating temperatures, such as at 25° C. or at 80° C., when combined with an appropriate salt(s), such as lithium salt(s); (2) is chemically stable against such salt(s); and (3) is thermally stable at electrochemical cell operating temperatures. In another embodiment, the conductive polymer exhibits ionic conductivity of at least $10^{-3}$ $Scm^{-1}$ at electrochemical cell operating temperatures, such as at 25° C. or at 80° C., when combined with an appropriate salt(s). In one embodiment, the structural material has a modulus in excess of $1 \times 10^5$ Pa at electrochemical cell operating temperatures. In one embodiment, the structural material has a modulus in excess of $1 \times 10^7$ Pa at electrochemical cell operating temperatures. In one embodiment, the structural material has a modulus in excess of $1 \times$ of $10^9$ Pa at electrochemical cell operating temperatures. In one embodiment, the third polymer (1) is rubbery; and (2) has a glass transition temperature lower than operating and processing temperatures. It is useful if all materials are mutually immiscible. In one embodiment the block copolymer exhibits ionic conductivity of at least $10^{-4}$ $Scm^{-1}$ and has a modulus in excess of $1 \times 10^7$ Pa or $1 \times 10^8$ Pa at electrochemical cell operating temperatures. Examples of cell operating temperatures include 25° C. and 80° C.

In one embodiment of the invention, the conductive phase can be made of a linear polymer. Conductive linear or branched polymers that can be used in the conductive phase include, but are not limited to, polyethers, polyamines, polyimides, polyamides, poly alkyl carbonates, polynitriles, and combinations thereof. The conductive linear or branched polymers can also be used in combination with polysiloxanes, polyphosphazines, polyolefins, and/or polydienes to form the conductive phase.

In another exemplary embodiment, the conductive phase is made of comb (or branched) polymers that have a backbone and pendant groups. Backbones that can be used in these polymers include, but are not limited to, polysiloxanes, polyphosphazines, polyethers, polydienes, polyolefins, polyacrylates, polymethacrylates (PMMA), and combinations thereof. Pendants that can be used include, but are not limited to, oligoethers, substituted oligoethers, nitrile groups, sulfones, thiols, polyethers (PE), polyamines, polyimides, polyamides, alkyl carbonates, polynitriles, other polar groups, single ion conducting groups, and combinations thereof.

Further details about polymers that can be used in the conductive phase can be found in International Patent Application Number PCT/US09/045356, filed May 27, 2009, U.S. Pat. No. 8,691,928, issued Apr. 8, 2014, International Patent Application Number PCT/US10/21065, filed Jan. 14, 2010, International Patent Application Number PCT/US10/21070, filed Jan. 14, 2010, U.S. patent application No. 13/255,092, filed Sep. 6, 2011, and U.S. Pat. No. 8,598,273, issued Dec. 3, 2013, all of which are included by reference herein.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte. Although not always stated explicitly, it should be understood that all electrolyte materials disclosed herein also include an appropriate electrolyte salt(s).

Suitable examples include alkali metal salts, such as Li salts. Examples of useful Li salts include, but are not limited to, $LiPF_6$, $LN(CF_3SO_2)_2$, $Li(CF_3SO_2)_3C$, $LiN(SO_2CF_2CF_3)_2$, $LiB(C_2O_4)_2$, $B_{12}F_xH_{x-12}$, $B_{12}F_{12}$, and mixtures thereof. Non-lithium salts such as salts of aluminum, sodium, and magnesium are examples of other salts that can be used with their corresponding metals.

In one embodiment of the invention, single ion conductors can be used with electrolyte salts or instead of electrolyte salts. Examples of lithium single ion conductors include, but are not limited to bound anions based on sulfonamide salts, boron based salts, and sulfate salts.

In one embodiment of the invention, the structural phase can be made of polymers such as polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly (cyclohexyl methacrylate), poly(cyclohexyl vinyl ether), poly(t-butyl vinyl ether), polyethylene, polyfluorocarbons such as polyvinylidene fluoride, or copolymers that contain styrene, methacrylates, and/or vinylpyridine. It is especially useful if the structural phase is rigid and is in a glassy or crystalline state.

In one embodiment of the invention, the structural phase or domain of an electrolyte material can be made up of a mixture of polymers. In some arrangements, at least a portion of the polymers are cross-linked or covalently bonded together. Poly(2,6-dimethylphenylene oxide), also known as poly(2,6-xylenyl oxide) or PXE, was developed in the 1950's and 1960's as an engineering thermoplastic with good mechanical properties (tensile modulus=3.2-3.5 GPa), good chemical and electrical resistance, and a high glass transition temperature ($T_g$=210° C. at 2000 Da molecular weight), allowing for its use over a wide temperature range. However, PXE is expensive to manufacture compared to most commodity polymers (e.g., polyacrylates, polystyrene (PS)). It was discovered that PXE is fully miscible with PS, which is unusual, as many combinations of different polymers cannot mix at a molecular level and can form only crude physical blends. This discovery allowed mixtures of PXE and PS to be marketed under the brand name Noryl™ (GE Plastics), wherein the PXE fraction provided good thermomechanical properties while the inclusion of PS allowed the manufacturing cost to be kept low.

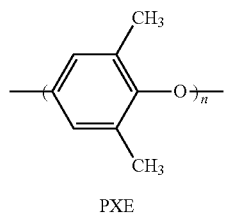

PXE

Figure 4:
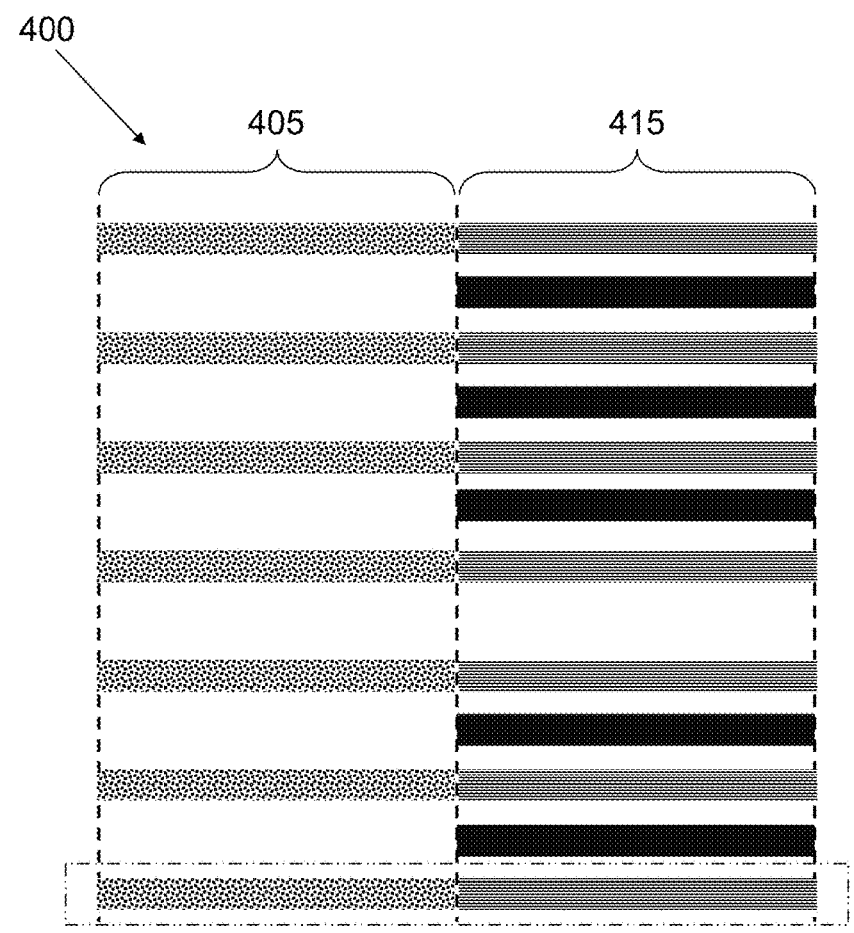
FIG. 4 is a schematic drawing that shows a novel new nanostructured material that includes ionically-conductive domains containing PEO and structural domains that contain both PS and PXE, according to an embodiment of the invention.

In one embodiment of the invention, an electrolyte material 400 includes two microscopically separated phases, an ionically-conductive phase 405 and a structural phase 415, which are self-assembled into domains, as shown in FIG. 4. The ionically conductive phase 405 comprises poly(ethylene oxide) (PEO) 420 (or other suitable polymer, as discussed above). The structural phase includes both polystyrene (PS) 460 as well as PXE 440. The PXE 440 may be thought of as an additive. Some or all of the PS polymers 460 are covalently bonded to PEO polymers 420. The PXE polymers 440 are miscible with the PS 460, and they both segregate to the structural phase 415 to separate from the PEO 420. Other combinations of structural polymers are possible, as long as they are miscible and can meet the modulus criteria discussed above. Thus there are PEO-PS block copolymers 465, and there are PXE polymers 440, which are not bonded to PEO 420, interspersed with the PS polymers (or copolymer blocks) 460 within the structural phase 415. This electrolyte material 400 may be referred to with the notation: PEO-PS(PXE). Although the schematic drawing in FIG. 4 shows a case where there are only two domains 405, 415, it should be understood that there may be any number of repetitions of 405 and 415. In addition, although this discussion has described materials based on PEO-PS diblock copolymers, it should be understood that analogous materials can be formed from multiblock copolymers, such as PEO-PS-PEO triblocks becoming PEO-PS(PXE)-PEO or PS-PEO-PS triblocks becoming PS(PXE)-PEO-PS(PXE), within the embodiments of the invention.

Figure 5:
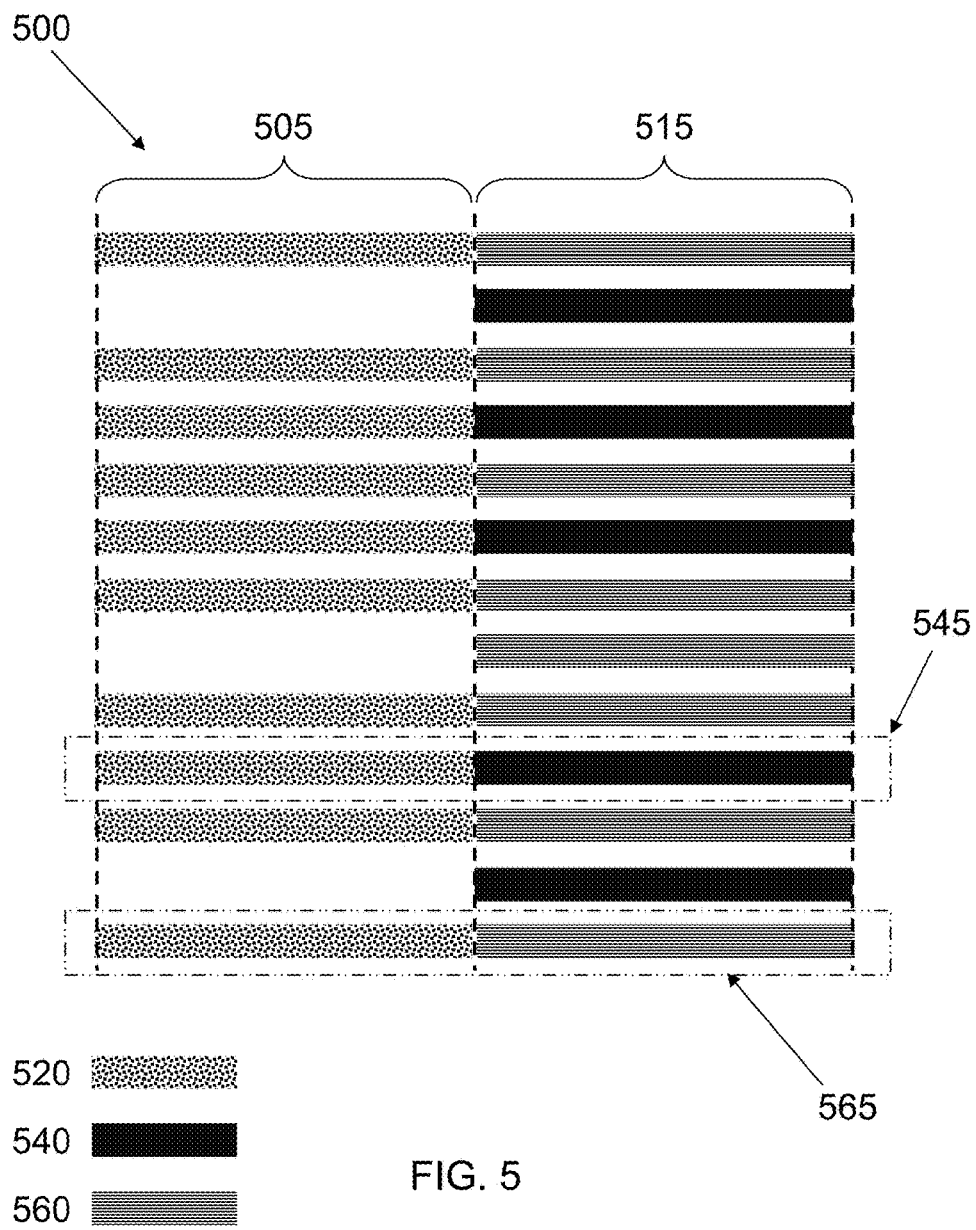
FIG. 5 is a schematic drawing that shows a novel new nanostructured material that includes ionically-conductive domains containing PEO and structural domains that contain both PS and PXE, according to an embodiment of the invention.

In another embodiment of the invention, as shown in FIG. 5, an electrolyte material 500 includes PEO 520, PS 560, and PXE 540. An ionically-conductive phase 505 is formed of poly(ethylene oxide) (PEO) 520 (or other suitable polymer, as discussed above) and a structural phase 515 is formed from a mixture of polymers such as PXE 540 and polystyrene (PS) 560; at least some of the PEO 520 is covalently bonded to at least some of the PXE 540, and at least some of the PEO 520 is covalently bonded to at least some of the PS 560. Some or all of the PEO 520 may be covalently bonded. Suitable choice of polymer molecular weights and ratios results in the formation of nanostructured domains made up of ionically-conductive phases 505 and structural phases 515, which have been formed by self-assembly. The PXE 540 is miscible with the PS 560, and they both segregate to the structural phase 515. Other combinations of structural polymers are possible, as long as they are miscible and can meet the modulus criteria discussed above. Thus there are PEO-PXE block copolymers 545 and PEO-PS block copolymers 565 within the electrolyte material 500. There may also be PXE polymers 540, which are not bonded to PEO 520, and PS polymers 560, which are not bonded to PEO 520, interspersed within the structural domain or phase 515. Although the schematic drawing in FIG. 5 shows a case where there are only two domains 505, 515, it should be understood that there may be any number of repetitions of 505 and 515. In addition, although this discussion has been about formation of diblock copolymers, it should be understood that analogous multiblock copolymers, such as triblocks, are also possible within the embodiments of the invention.

Figure 6:
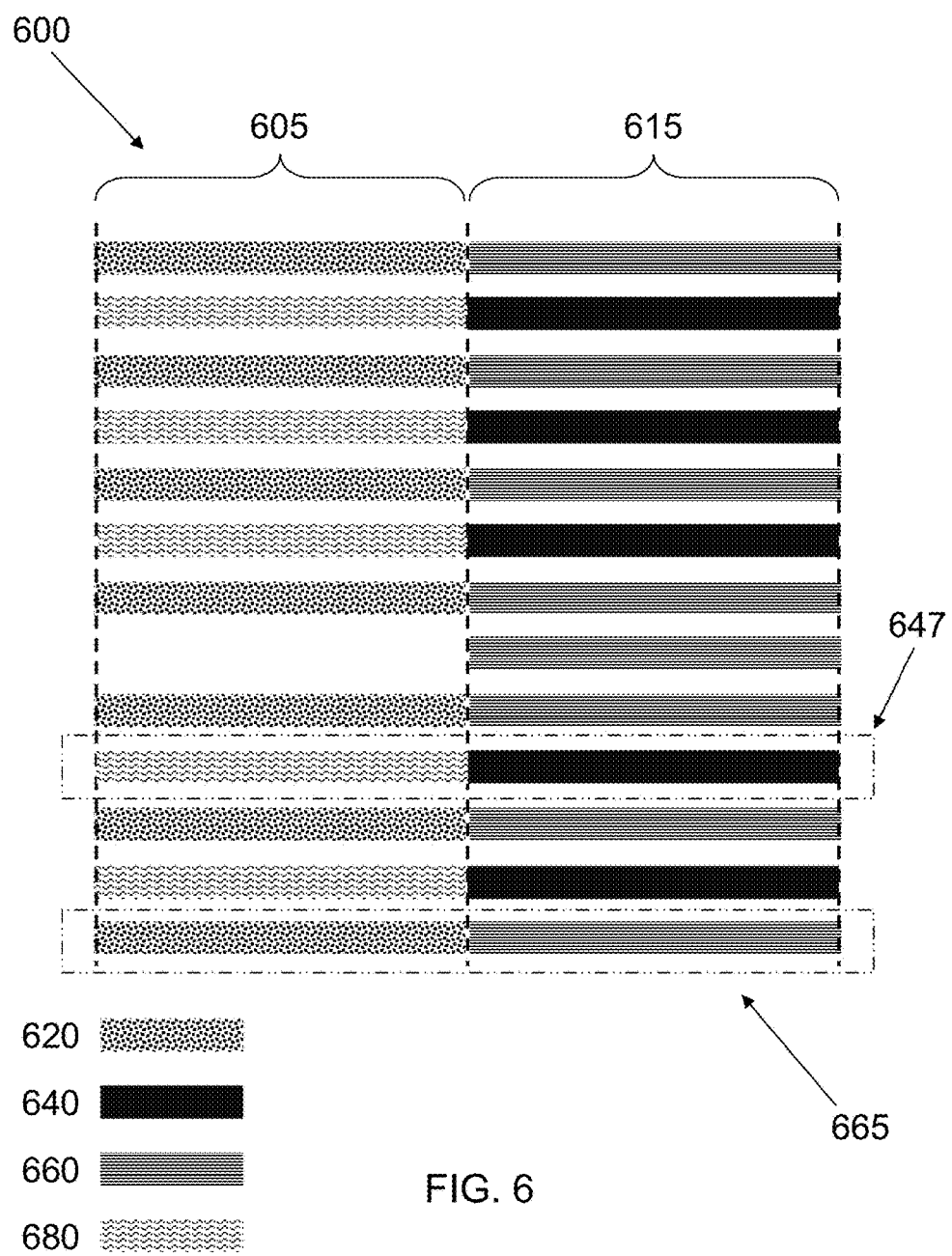
FIG. 6 is a schematic drawing that shows a novel new nanostructured material that includes ionically-conductive domains containing two kinds of polymers and structural domains that contain two kinds of polymers, according to an embodiment of the invention.

In another embodiment of the invention, an electrolyte material 600 includes PEO 620, PS 660, PXE 640, and another polymer 680. An ionically-conductive phase 605 and a structural phase 615 have been formed by self-assembly, as shown in FIG. 6. The ionically conductive phase 605 includes at least two different kinds of ionically-conductive polymers that are miscible with one another. In an exemplary embodiment, one of the ionically-conductive polymers is poly(ethylene oxide) (PEO) 620 and the other ionically-conductive polymer 680 is PMMA-g-PE (polymethacrylate grafted with polyether), which is miscible with PEO. Other suitable ionically-conductive polymers can be chosen from the list shown above. The structural phase includes a mixture of polymers such as PXE 640 and polystyrene (PS) 660. The PXE polymers 640 are miscible with PS 660, and they both segregate to the structural phase 615 when combined with PEO 620 and PMMA-g-PE 680 to form the material 600. Other combinations of structural polymers are possible, as long as they are miscible and can meet the modulus criteria discussed above. In one arrangement, at least some PEO polymers 620 are covalently bonded to at least some PS polymers 660. In one arrangement, at least some PEO polymers 620 are covalently bonded to at least some PXE polymers 640. In one arrangement, at least some PMMA-g-PE 680 are covalently bonded to at least some PXE polymers 640. In one arrangement, at least some PMMA-g-PE 680 are covalently bonded to at least some PS polymers 660. Thus there may be PEO-PS block copolymers 665 and PMMA-g-PE -PXE block copolymers 647 within the material 600. There may also be (PMMA-g-PE)-PS block copolymers and PEO- PXE block copolymers (not shown) within the electrolyte material 600.

There may also be PXE polymers 640 (not shown), which are not bonded in a block copolymer, and PS polymers 660, which are not bonded in a block copolymer, interspersed within the structural phase 615. Although the schematic drawing in FIG. 6 shows a case where there are only two domains 605, 615, it should be understood that there may be any number of repetitions of 605 and 615. In addition, although this discussion has been about formation of diblock copolymers, it should be understood that analogous multi-block copolymers, such as triblocks, are also possible within the embodiments of the invention.

Using a mixture of PXE and PS as an example, a PS(PXE) structural phase has a glass transition temperature ($T_g$) that increases in a roughly linear fashion as the proportion of PXE relative to PS increases, that is, as more PXE is included. For example, using PXE with a $T_g$ of 200° C., and PS with a $T_g$ of 100° C., the $T_g$ of a mixture of the two in the structural phase would increase from about 100° C. at 0 wt % PXE in PS to about 150° C. at 50 wt % PXE in PS and to about 200° C. at 0 wt % PS in PXE. It may be useful to use PXE of sufficiently high molecular weights (≥2000 Da) to have high glass transition temperatures (≥200° C.). The modulus of a PEO-PS(PXE) material may be comparable to that of the PS-PEO block copolymer and is likely to be even greater. Such a mixture of polymers in the structural phase of the inventive electrolyte material can make it possible to operate a battery cell at higher temperature and with increased reliability and durability when used with lithium metal anodes in lithium batteries as compared to batteries using PS-PEO alone.

In some embodiments of the invention, the ionically-conductive polymer has a molecular weight greater than 50,000 Daltons or greater than 100,000 Daltons. In some embodiments of the invention, the structural polymer has a molecular weight greater than 50,000 Daltons or greater than 100,000 Daltons. In some embodiments of the invention, diblock copolymers that make up the electrolyte have molecular weights greater than 150,000 Daltons or greater than 350,000 Daltons. In some embodiments of the invention, triblock copolymers that make up the electrolyte have a molecular weights greater than 250,000 Daltons or greater than 400,000 Daltons. The molecular weights given herein are weight-averaged molecular weights.

In another arrangement, crosslinking can be induced in the structural phase, such as in the PS(PXE) phase, to further increase the modulus.

The sizes or dimensions of the domains in the electrolyte materials described herein can be adjusted by changing the relative amounts of the ionically-conductive and structural phases. In various embodiments, the domains can have morphologies that are lamellar, cylindrical, spherical, or bicontinuous, such as gyroidal. In one arrangement, the ionically-conductive domain and the structural domain are arranged as alternating lamellar domains. In one arrangement, the ionically-conductive domain and the structural domain are arranged as bicontinous domains. In one arrangement, wherein the ionically-conductive domain and the structural domain alternate on a length scale of 5-500 nm, or any range subsumed therein. In one arrangement, structural lamellar domains have a width between 5 and 500 nm, or any range subsumed therein. In one arrangement, ionically-conductive lamellar domains have a width between 5 and 500 nm, or any range subsumed therein.

It can be useful to optimize the molecular weight of PXE polymers used in a PEO-(PS,PXE) block copolymer. Although high molecular weights (e.g., 2000 Da or greater) yield high glass transition temperatures (greater than 200° C.), processing of such high molecular weight polymers can be difficult. Processing (especially solubility) generally becomes easier with lower molecular weight. In an exemplary embodiment, the molecular weight of the PXE is lower than the molecular weight of polystyrene. This may be important for miscibility of PXE and PS in the novel polymer materials disclosed herein. In one embodiment, the molecular weight of PXE in a PEO-PS(PXE) material is between 1000 and 10,000 Daltons In another embodiment, the molecular weight of PXE in a PEO-PS(PXE) material is between 1500 and 3000 Daltons.

In one arrangement, the PXE in PEO-PS(PXE) may be singly or doubly terminated with the phenolic groups as would normally be expected from its industrial synthesis. In another arrangement, the PXE phenolic ends can be derivatized to form groups which are less likely to react with anodic or cathodic battery materials; for instance, alkylation of the phenolic groups to form alkyl ethers would reduce the likelihood of reaction with a lithium metal anode. In another arrangement, the PXE phenolic ends can be derivatized to form groups with additional functionality; for instance, allylation to form allyl ethers may allow the PXE groups to be crosslinked through radical reactions.

In one arrangement, a PEO-PS(PXE) polymer mixture has between 0 wt % and 90 wt % PXE and between 10 wt % and 100 wt % PS in the structural phase, or any range subsumed therein. In another arrangement, there is less than 50 wt % PXE and more than 50 wt % PS in the structural phase.

In one arrangement, the total volume fraction of the structural phase (PXE together with PS) within a PEO-PS (PXE) polymer mixture is approximately 50%. The volume fraction of the conductive phase (PEO) is also approximately 50%. Such a composition may favor formation of lamellar domains. In some arrangements, the structural phase makes up between 40 and 60 volume percent of the PEO-PS(PXE) material, and the conductive phase makes up the rest.

The ionic conductivity of the electrolyte materials disclosed herein can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids. In one arrangement, lithium-ion conducting ceramic particles are added to the ionically-conductive phase. Examples of useful, lithium-ion conducting inorganic ceramics include sulfide, oxide and phosphate compounds. More specific examples include $Li_3N$, LISICON (lithium super ionic conductor—e.g., $Li_{2+2x}Zn_{1-x}GeO_4$), LIPON (lithium phosphorous oxy-nitride), LLTO (lithium lanthanide tantalum oxide), LLZO (lithium lanthanide zirconium oxide), LATP (e.g., $Li_{1.5}Al_{0.5}Ti_{1.5}(PO_4)_3$), thio-LISICON (e.g., $Li_xM_{1-y}M_y'S_4$ (M=Si, Ge, and M'=P, Al, Zn, Ga, Sb)), $Li_2S$—$P_2S_5$, garnet-type Li ion conducting oxides, and the like.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

In one embodiment of the invention, neither small molecules nor plasticizers are added to the block copolymer electrolyte and the block copolymer electrolyte is a dry polymer.

Further details about block copolymer electrolytes are described in U.S. Pat. No. 8,563,168, issued Oct. 22, 2013, U.S. Pat. No. 8,268,197, issued Sep. 18, 2012, and U.S. Pat. No. 8,889,301, issued Nov. 18, 2014, all of which are included by reference herein.

EXAMPLE

The following example provides details relating to composition, fabrication and performance characteristics of electrolyte materials in accordance with the present invention. It should be understood the following is representative only, and that the invention is not limited by the detail set forth in this example.

A vial was charged with poly(2,6-dimethyl-1,4-phenylene oxide) (PXE, Aldrich 181781; see table), cyclohexanone (1.5 g) and xylenes (1.5 g), then stirred overnight at 45° C. To the resulting clear solutions was added PS-PEO-PS block copolymer (PEO 153 kDa, 58 wt %; 375 mg), and the solutions were again stirred overnight at 45° C. These clear solutions were then poured onto glass slides and heated on a 75° C. hotplate to provide clear films. Samples of these films were analyzed by DSC to determine glass transition temperature (Tg) and DMA to observe the softening point (storage modulus <10 MPa). These results are shown in Table I.

TABLE I

| Sample | PXE (mg) | PS-PEO-PS (mg) | $T_g$ (° C.) | $T_{soft}$ (° C.) |
|---|---|---|---|---|
| A | 0 | 375 | 96 | 83 |
| B | 20 | 375 | 109 | 115 |
| C | 38 | 375 | 118 | 119 |
| D | 56 | 375 | 123 | 107 |
| E | 75 | 375 | 127 | 138 |

In another embodiment of the invention, a battery electrode has electrode active material particles, optional electronically-conductive particles, and an electrolyte material as described above. The electrode active material particles and the optional electronically-conductive particles are distributed randomly throughout the electrolyte material.

If the electrode is a cathode, the electrode active material particles may be made of a material such as lithium iron phosphate (LFP), $LiCoO_2$, $LiMn_2O_4$, lithium nickel cobalt aluminum oxide (NCA), and lithium nickel cobalt manganese oxide (NCM).

If the electrode is an anode, the electrode active material particles may be made of a material such as graphite, lithium metal, Li—Al, Li—Si, Li—Sn, Li—Mg, Si, Si—Sn, Si—Ni, Si—Cu, Si—Fe, Si—Co, Si—Mn, Si—Zn, Si—In, Si—Ag, Si—Ti, Si—Ge, Si—Bi, Si—Sb, Si—Cr, metal oxides, silicon carbides, and mixtures thereof.

In another embodiment of the invention, a battery cell has a positive electrode comprising a positive electrode active material configured to absorb and release lithium ions, a negative electrode comprising a negative electrode active material configured to absorb and release lithium ions, and an electrolyte material as described above. The electrolyte material is positioned to provide ionic communication between the positive electrode and the negative electrode.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself

We claim:

1. An electrolyte material comprising:
   a first phase comprising a plurality of first polymers and a salt, the first phase forming an ionically-conductive domain; and
   a second phase comprising a plurality of second polymers and third polymers, the second phase forming a structural domain adjacent to the ionically-conductive domain;
   wherein at least some of the first polymers are covalently bonded to at least some of the second polymers to form first block copolymers.

2. The electrolyte material of claim 1 wherein at least some of the first polymers are covalently bonded to at least some of the third polymers to form second block copolymers.

3. The electrolyte material of claim 1 wherein the first polymer is selected from the group consisting of polyethers, polyamines, polyimides, polyamides, poly(alkyl carbonates), polynitriles, polysiloxanes, polyphosphazenes, polyolefins, polydienes, and combinations thereof.

4. The electrolyte material of claim 1 wherein the first polymer comprises an ionically-conductive comb polymer, the comb polymer comprising a backbone and pendant groups.

5. The electrolyte material of claim 4 wherein the backbone comprises one or more selected from the group consisting of polysiloxanes, polyphosphazenes, polyethers, polydienes, polyolefins, polyacrylates, polymethacrylates, and combinations thereof.

6. The electrolyte material of claim 4 wherein the pendants comprise one or more selected from the group consisting of oligoethers, substituted oligoethers, nitrile groups, sulfones, thiols, polyethers, polyamines, polyimides, polyamides, poly(alkyl carbonates), polynitriles, other polar groups, and combinations thereof.

7. The electrolyte material of claim 1 wherein the second polymer and the third polymer are each selected independently from the group consisting of polystyrene, hydrogenated polystyrene, polymethacrylate, poly(methyl methacrylate), polyvinylpyridine, polyvinylcyclohexane, polyimide, polyamide, polypropylene, poly(2,6-dimethyl-1,4-phenylene oxide) (PXE), polyolefins, poly(t-butyl vinyl ether), poly(cyclohexyl methacrylate), poly(cyclohexyl vinyl ether), poly(t-butyl vinyl ether), polyethylene, polyfluorocarbons such as polyvinylidene fluoride, or copolymers that contain styrene, methacrylates, and/or vinylpyridine.

8. The electrolyte material of claim 1 wherein the ionically-conductive domain and the structural domain are arranged as alternating lamellar domains.

9. The electrolyte material of claim 8 wherein the ionically-conductive domain and the structural domain each has a width between 5 and 500 nm.

10. The electrolyte material of claim 1 further comprising fourth polymers in the first phase wherein at least some of the fourth polymers are covalently bonded to at least some of the third polymers to form third block copolymers.

11. The electrolyte material of claim 10 wherein the fourth polymers are selected from the group consisting of polyethers, polyamines, polyimides, polyamides, poly(alkyl carbonates), polynitriles, polysiloxanes, polyphosphazenes, polyolefins, polydienes, and combinations thereof.

12. The electrolyte material of claim 1 wherein the salt is a lithium salt.

13. The electrolyte material of claim 1 wherein the electrolyte material is a solid at temperatures between 20° C. and 100° C.

14. The electrolyte material of claim 1 further comprising a liquid electrolyte, wherein the electrolyte material is a gel.

15. The electrolyte material of claim 1 further comprising lithium-ion conducting inorganic ceramics particles in the first phase.

16. The electrolyte material of claim 1 wherein the second phase is cross-linked.

17. A electrolyte material comprising:
an ionically-conductive phase comprising a plurality of PEO polymers and a salt, the ionically-conductive phase forming a first domain; and
a structural phase comprising a plurality of PS polymers and PXE polymers, the structural phase forming a second domain adjacent to the first domain;
wherein at least a portion of the PEO polymers and at least a portion of the PS polymers are covalently bonded together to form first block copolymers.

18. The electrolyte material of claim 17 wherein the first block copolymers are linear block copolymers.

19. The electrolyte material of claim 17 wherein at least a portion of the PEO polymers and a portion of the PXE polymers are covalently bonded together to form second block copolymers.

20. The electrolyte material of claim 19 wherein the second block copolymers are linear block copolymers.

21. A battery electrode, comprising:
electrode active material particles;
an electrolyte material according to claim 1; and
optional electronically-conductive particles;
wherein the electrode active material particles and the optional electronically-conductive particles are distributed randomly throughout the electrolyte material.

22. The electrode of claim 21 wherein the electrode is a cathode, and the electrode active material particles comprise a material selected from the group consisting of lithium iron phosphate (LFP), $LiCoO_2$, $LiMn_2O_4$, lithium nickel cobalt aluminum oxide (NCA), and lithium nickel cobalt manganese oxide (NCM).

23. The electrode of claim 21 wherein the electrode is an anode, and the electrode active material is selected from the group consisting of graphite, lithium metal, Li—Al, Li—Si, Li—Sn, Li—Mg, Si, Si—Sn, Si—Ni, Si—Cu, Si—Fe, Si—Co, Si—Mn, Si—Zn, Si—In, Si—Ag, Si—Ti, Si—Ge, Si—Bi, Si—Sb, Si—Cr, metal oxides, silicon carbides, and mixtures thereof.

* * * * *